United States Patent [19]

Heilig

[11] 4,436,961

[45] Mar. 13, 1984

[54] COMMUNICATIONS SYSTEM CONNECTING CIRCUIT FOR CONTROLLING DERIVATION OF OPERATING POWER FROM SUBSCRIBER LINE CURRENT

[75] Inventor: Thomas Heilig, Spiegelberg, Fed. Rep. of Germany

[73] Assignee: Licentia Patent-Verwaltungs-GmbH, Frankfurt am Main, Fed. Rep. of Germany

[21] Appl. No.: 285,867

[22] Filed: Jul. 22, 1981

[30] Foreign Application Priority Data

Jul. 23, 1980 [DE] Fed. Rep. of Germany ....... 3027783

[51] Int. Cl.$^3$ ...................... H04B 1/58; H04M 1/76; H04M 19/00
[52] U.S. Cl. ...................................... 179/77; 179/70; 179/170 NC
[58] Field of Search .................. 179/16 F, 18 FA, 70, 179/77, 81 R, 170 D, 170 NC, 81 B

[56] References Cited

U.S. PATENT DOCUMENTS

| | | | |
|---|---|---|---|
| 3,899,646 | 8/1975 | Cobb et al. | 179/170 NC |
| 4,322,586 | 3/1982 | Mein et al. | 179/170 NC |
| 4,345,117 | 8/1982 | Sweet | 179/81 R |
| 4,357,495 | 11/1982 | Sweet et al. | 179/77 |

*Primary Examiner*—G. Z. Rubinson
*Assistant Examiner*—Randall P. Myers
*Attorney, Agent, or Firm*—Spencer & Frank

[57] ABSTRACT

A circuit arrangement for connecting a communications set to a subscriber line of a subscription communication network in which each subscriber line includes two wires between which the communications set is conductively connected, which arrangement includes an operational amplifier having a noninverting input, an inverting input and an output, a setting transistor connected to have its conductive state controlled by the signal at the amplifier output and connected for influencing the current flowing between the two wires of the associated line and to the communications set, and circuit elements connected for applying to the amplifier inputs respective voltages proportional to the voltage between the two wires of the associated line and proportional to the current flowing between the two wires of the associated line and to the communications set.

4 Claims, 3 Drawing Figures

COMMUNICATIONS SYSTEM CONNECTING CIRCUIT FOR CONTROLLING DERIVATION OF OPERATING POWER FROM SUBSCRIBER LINE CURRENT

BACKGROUND OF THE INVENTION

The present invention relates to a circuit arrangement for connecting a subscriber's set to the subscriber line in an electrical two-way communication network.

When terminating a subscriber line or connecting a subscriber's set to such a line in a system of this type, there exists the requirement for the most accurate and constant matching of the characteristic impedance of this line whereby the phase shift caused by the length of the line must be compensated. The simplest solution to this problem is to terminate the line with a constant ohmic resistance of the value of the characteristic impedance of the line, with an additional blind component to compensate for the phase shift caused by the line. However, this solution is available only if the subscriber's set is not fed through the subscriber line.

In almost all Post Office owned telephone networks, however, the subscriber is fed from the central office. Due to the different line lengths, there result rather different supply currents to various subscriber sets. For example, when a screen text modem is connected to a telephone subscriber's line, with supply currents of between 17 and 22 mA, a terminating d.c. impedance of $\leq 400$ ohms must be maintained; for supply currents from 22 to 60 mA, a terminating d.c. impedance of $\leq 300$ ohms must be maintained; and for the transmission of alternating current modem signals, a terminating impedance of 600 ohms. Without the aid of inductive and/or transformer components, these requirements cannot be met.

SUMMARY OF THE INVENTION

It is therefore an object of the present invention to provide a novel circuit arrangement of the above type with which it is possible to supply current to a subscriber's set without the aid of inductive or transformer components and without significantly increasing production costs.

The above and other objects are achieved, according to the invention, by the provision of a circuit arrangement for connecting a communications set to a subscriber line of a subscription communication network in which each subscriber line includes two wires between which the communications set is conductively connected, which circuit arrangement is composed of an operational amplifier having a noninverting input, an inverting input and an output, a setting transistor connected to have its conductive state controlled by the signal at the amplifier output and connected for influencing the current flowing between the associated line and the communications set, and circuit elements connected for applying to the amplifier inputs respective voltages proportional to the voltage between the two wires of the associated line and proportional to the current flowing between the two wires of the associated line and to the communications set.

The above-mentioned current flowing to the communications set provides the power required for its operation, as distinguished from information signals which are separately processed.

The advantages of the solution provided by the present invention are that the novel circuit arrangement can be microminiaturized in monolithic or hybrid form and is designed in a simple and energy saving manner.

DESCRIPTION OF THE PREFERRED EMBODIMENTS

Figure 1:
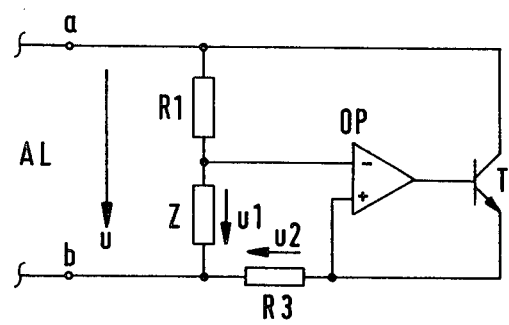
FIG. 1 is a circuit diagram of a basic circuit on which the present invention is based.

The circuit shown in FIG. 1 is connected to a terminal line AL having two terminals a and b. The two terminals are connected to a voltage divider R1, Z as well as, via a measuring resistor R3, to the collector-emitter path of an npn setting transistor T. The base of the setting transistor T is connected with the output of an operational amplifier OP whose inverting input (−) is connected to the midpoint of the voltage divider and whose noninverting input (+) is connected to the emitter of the npn setting transistor T. Due to the high gain of the operational amplifier, its output signal will cause the voltage u2 appearing at its noninverting input to be equal to the divider midpoint voltage u1, the latter being proportional to the voltage u between terminals a and b. Neglecting the value of the measuring resistance R3 with respect to the divider resistances, the input resistance of the circuit therefore takes on the value (R1+Z) R3/Z, i.e. a current independent impedance which can be fixed by selection of the value of Z.

Figure 2:
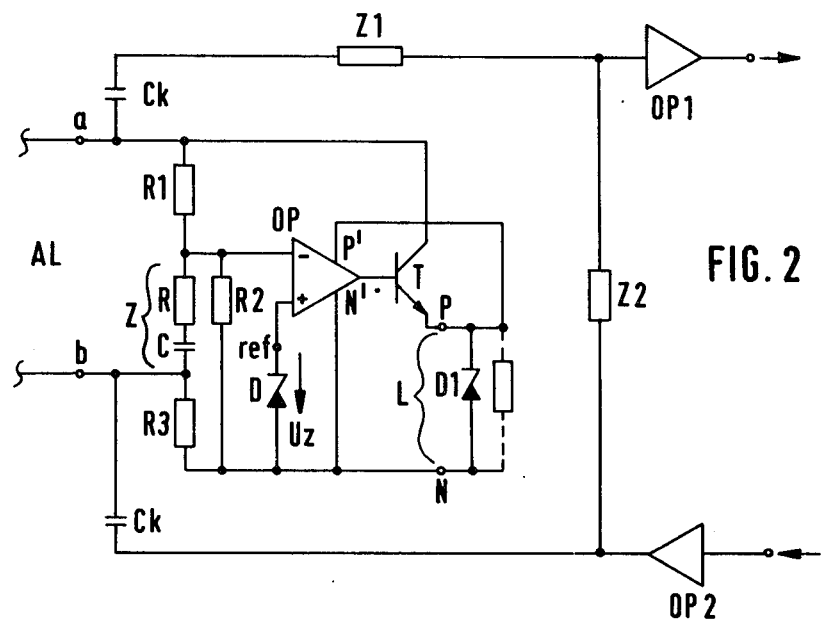
FIG. 2 is a circuit diagram of a particularly advantageous embodiment of a circuit according to the invention.

FIG. 2 shows a specific circuit based on the arrangement of FIG. 1, supply voltage generation and alternating current signal coupling components being shown in addition. At the two terminals a and b of the subscriber's line AL there is shown the voltage divider R1, Z, to whose dividing point there is again connected the inverting input (−) of the operational amplifier OP. The impedance Z in this embodiment is formed of the series connection of an ohmic resistor R with a capacitor C resulting in an almost constant value a.c. resistor with the desired frequency behavior. The subscriber loop itself is formed of the series connection of the collector-emitter path of the setting transistor T, the load L is to be supplied and the measuring resistor R3 whose one end is connected to the terminal b of the subscriber's line AL and whose other end is connected, via a Zener diode D, to the noninverting input of the operational amplifier OP. Amplifier OP receives a supply voltage between terminals P' and N'.

With respect to direct current, the operational amplifier OP sets itself to the reverse breakdown voltage Uz of the Zener diode D as follows: $Uz = U \cdot R2/(R1+R2)$, where U is the direct voltage between terminals a and b of the subscriber's line AL and the resistor R2 is connected between the dividing point of the voltage divider R1, Z and the side of Zener diode D remote from amplifier OP. The direct output voltage component of OP is the reverse breakdown voltage of D1 plus the base-emitter voltage (appr. 0.7 volts) of transistor T. The a.c. voltage component of the OP output voltage is a complex function of the current in the subscriber line and the output voltage of OP2 and can therefore not expressed in a simple equation.

With this circuit, the direct voltage behavior of the circuit can advantageously be set in such a manner that the subscriber's line AL can be terminated with a direct current impedance having the required tolerance range at an almost constant direct voltage U between the terminals a and b, thereby keeping the power loss in the series setting transistor T at a low value. The supply voltage between terminals P and N thus obtained from the loop current is stabilized by means of a further Zener diode D1 and possibly by means of filter members and if fed to the active circuits to be supplied, the latter being shown in the drawing by the connecting lines P, P' and N, N' for supplying power to the operational amplifier OP and by a resistor shown in dashed lines.

Figure 3:
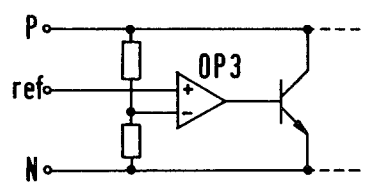
FIG. 3 is a circuit diagram of an alternative embodiment of a portion of the circuit of FIG. 2.

Instead of the Zener diode D1, a transverse regulator as shown in FIG. 3 can also be used, which has the advantage of high voltage stability and of suppressing to a high degree the temperature and long-term drifts occurring at the Zener diode D or the deviations produced by differences between individual units, respectively. The transverse regulator of FIG. 3 is composed of a resistive voltage divider connected between terminals P and N and a further operational amplifier OP3 having its inverting input connected to the voltage divider center tap and its noninverting input connected to the connecting point (ref) between Zener diode D and the noninverting input of amplifier OP. The output of amplifier OP3 is connected to the base of a further transistor whose collector-emitter path is connected between terminals P and N. The voltage for supplying the active circuits of the subscriber's set can then be taken from across the further transistor.

The circuit of FIG. 2 further shows a series path composed of a coupling capacitor Ck and a decoupling operational amplifier OP1 for coupling out received alternating current information signals appearing at terminal a and a series path composed of a coupling capacitor Ck and a decoupling operational amplifier OP2 for coupling in alternating current information signals to be transmitted to terminal b. In this case, a further impedance Z1 is connected in the receiving signal branch and a third impedance Z2 is included between the receiver input and transmitter output, with these impedances being dimensioned so that optimum decoupling between transmitted and received signals can be realized. Under especially favorable circumstances, the dimensions of the first impedance Z may suffice to provide sufficient decoupling between transmitted and received signals, i.e. the further impedances Z1 and Z2 can be omitted. Typical values of voltages and circuit components are (referring FIG. 2):

a.c. component of u is approximately 200 mVolts,
d.c. component of u is 5.4 Volts;
Uz is 1.2 Volts;
R1 = 453 k$\Omega$;
R2 = 137 k$\Omega$;
R3 = 4.2 $\Omega$;
R = 2.21 k$\Omega$;
Z1 = 100 k$\Omega$;
Z2 = 100 k$\Omega$;
C = 4.7 $\mu$F;
Ck = 100 $\mu$F;
D1 = BZX 55 C4V2;
T = 2 N 2907 A;
OP1, 2, 3 = LM 346;
D = ICL 8069.

It will be understood that the above description of the present invention is susceptible to various modifications, changes and adaptations, and the same are intended to be comprehended within the meaning and range of equivalents of the appended claims.

What is claimed is:

1. A circuit arrangement for connecting a communications set, defining a subscriber loop containing a load to be supplied with operating power, to a subscriber line of a subscription communication network in which each subscriber line includes two wires between which the communications set is conductively connected, said circuit arrangement comprising: an operational amplifier having a noninverting input, an inverting input and an output; a setting transistor connected to have its conductive state controlled by the signal at said amplifier output and connected for influencing the current flowing between the two wires of the associated line and through the subscriber loop; a voltage divider connected between the two wires of the subscriber line and having a center tap connected to the inverting input of said amplifier for applying to said amplifier inverting input a voltage proportional to the voltage between the two wires of the associated line ; a measuring resistor connected to conduct the current flowing through the subscriber loop and connected between one wire of the line and the noninverting input of said amplifier; a source of a reference voltage connected between said measuring resistor and said noninverting input of said amplifier; and a second resistor connected between said inverting input of said amplifier and the end of said reference voltage source remote from said amplifier noninverting input; and wherein the load to be supplied with operating power is connected in series between said transistor and one wire of the associated line.

2. Arrangement as defined in claim 1 wherein said voltage divider comprises a complex impedance connected to one side of its center tap.

3. Arrangement as defined in claim 1 further comprising first decoupling means connected to one wire of the associated line for conducting information signals received via the line to the communications set, and second decoupling means connected to the other wire of the associated line for conducting information signal emitted by the communications set to the line.

4. Arrangement as defined in claim 3 further comprising a first impedance connected in series between one said decoupling means and the corresponding wire, and a second impedance connected between the input of said first decoupling means and the output of said second decoupling means.

* * * * *